United States Patent [19]

Qurnell et al.

[11] 4,197,652
[45] Apr. 15, 1980

[54] PLANE OF REFERENCE DEVICE

[75] Inventors: Franklin D. Qurnell; Charles B. Patterson, both of San Jose, Calif.

[73] Assignee: General Electric Company, San Jose, Calif.

[21] Appl. No.: 900,437

[22] Filed: Apr. 27, 1978

[51] Int. Cl.² .................. G01B 5/25; G01B 5/20; G21C 17/00; F16C 29/00
[52] U.S. Cl. ................. 33/174 Q; 33/174 P; 176/19 R; 308/4 R
[58] Field of Search ............... 33/1 M, 125 M, 125 R, 33/125 T, 147 E, 174 R, 174 Q, 174 M, 174 P; 176/19 R; 308/4 R

[56] References Cited

U.S. PATENT DOCUMENTS

| 2,470,404 | 5/1949 | Kloos | 33/174 Q |
|---|---|---|---|
| 2,728,993 | 1/1956 | Meyer | 33/174 R |
| 3,273,249 | 9/1966 | Klaassen | 33/125 M |
| 3,346,964 | 10/1967 | Schiller et al. | 33/147 E |
| 3,434,218 | 3/1969 | Potter | 33/1 M |
| 3,722,842 | 3/1973 | Schweizer | 33/169 R |
| 4,036,686 | 7/1977 | Weibacher et al. | 176/19 R |
| 4,048,009 | 9/1977 | Weilbacher | 176/19 R |

FOREIGN PATENT DOCUMENTS

| 100164 | 6/1925 | Fed. Rep. of Germany | 33/174 R |
|---|---|---|---|
| 1473885 | 3/1969 | Fed. Rep. of Germany | 33/1 M |
| 887917 | 1/1962 | United Kingdom | 33/174 Q |
| 902792 | 8/1962 | United Kingdom | |

Primary Examiner—Richard R. Stearns
Attorney, Agent, or Firm—Ivor J. James, Jr.; Samuel E. Turner; Raymond G. Simkins

[57] ABSTRACT

A readily transportable device of relative light weight comprising a pair of tensioned guides for providing accurate and stable reference planes. An embodiment comprises a pair of rods or guides in tension between a pair of end members, the end members being spaced apart by a compression member. The tensioned guides provide planes of reference for measuring devices moved therealong adjacent a component to be measured. The device is especially useful for making on-site dimensional measurements of components, such as irradiated and therefore radioactive components, that cannot readily be transported to an inspection laboratory.

31 Claims, 4 Drawing Figures

PLANE OF REFERENCE DEVICE

BACKGROUND

There are numerous components in industrial and utility installations which require on-site pre-service inspection and/or periodic in-service inspection to verify continued serviceability. Such inspection frequently includes dimensional measurements. A notable example is the on-site inspection of components of a nuclear reactor, especially replaceable components such as control rods, fuel elements and fuel channels. A typical fuel assembly having a removable and reusable flow channel 36 is shown in U.S. Pat. No. 3,689,358. Such an elongated fuel channel may be in the order of 13 cm in transverse cross section dimensions and in the order of 4 m in length. Dimensional tolerances over the length of such a channel may be in order of 0.127 mm or less. To perform the necessary measurement of such a component, it is clear that an elongated accurate and stable plane of reference is required.

Prior attempts to provide accurate and stable measurement reference planes have involved structural members with large moments of inertia and great mass. Examples are thick granite or metal surface plates and multiple beam structures. An example of the surface plate approach is shown in German patent publication No. 2,532,840. Beam structures are exemplified by U.S. Pat. Nos. 4,036,686 and 4,048,009. Such prior approaches generally have been unsatisfactory because of the difficulty of transporting such massive structures and because of distortion thereof from handling and from thermal stresses.

Thus an object of the invention is to provide a lightweight, portable and dimensionally stable structure capable of maintaining highly accurate measurement reference planes.

SUMMARY

The plane of reference device of the invention comprises a pair of elongated, parallel rods or guides tensioned between a pair of spaced end support plates or members, the support plates being maintained apart by one or more compressively loaded structural members. To enhance self-alignment of the guides, spherical ball seats are provided between the guide ends and the end support plates. Resilient means, such as spring washers, maintain constant tension of the guides. A carriage provides a mounting platform for the desired measuring instruments and it is movable along the guides adjacent to the component to be measured.

DRAWING

DESCRIPTION

Figure 1:
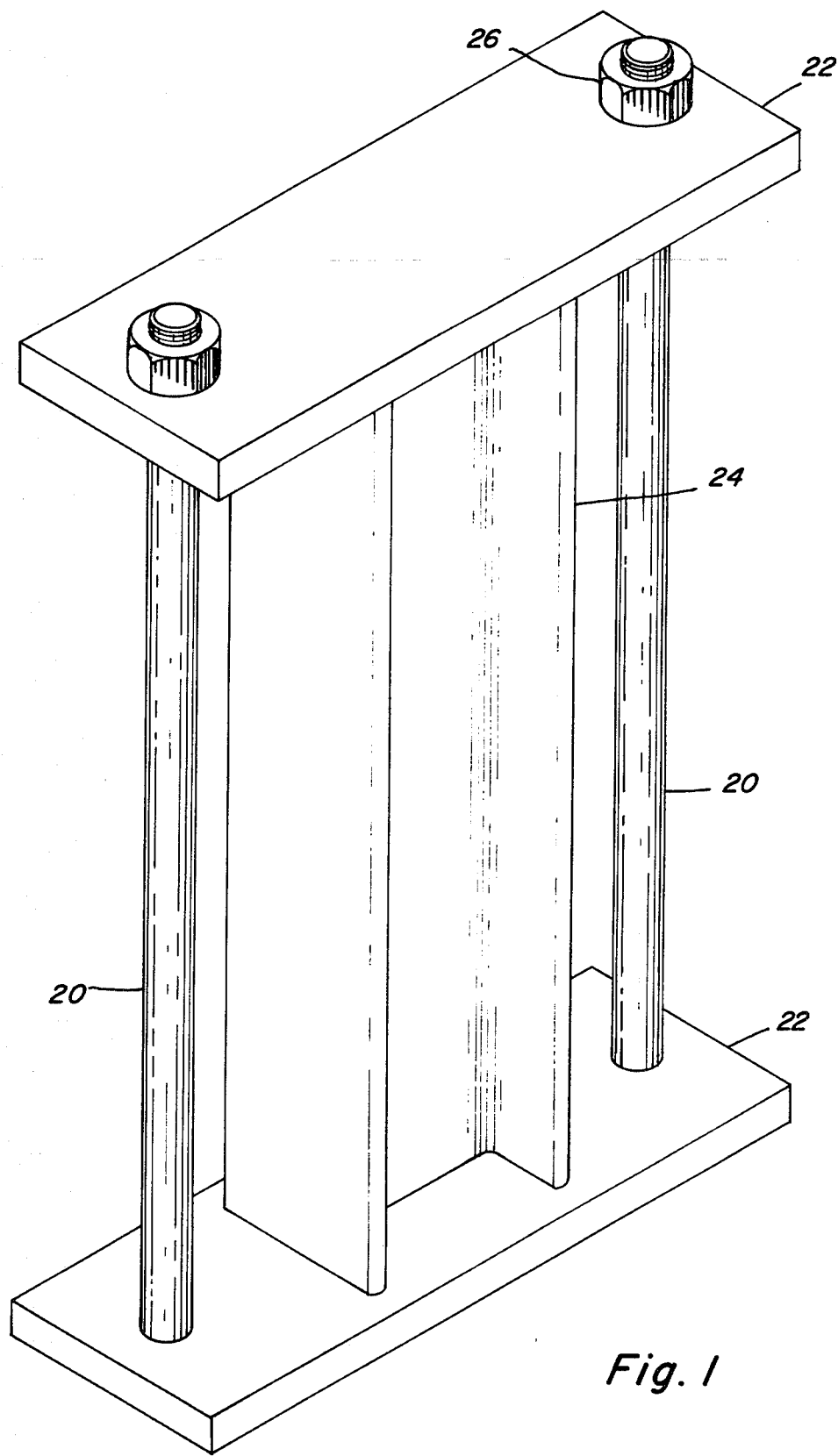
FIG. 1 is an isometric view of a basic embodiment of the plane of reference device of the invention.

The basic form of the invention shown in FIG. 1 comprises a pair of spaced, parallel guides or rods 20 maintained in tension between spaced end plates 22. The plates are attached (as by welding) to opposite ends of a compressive load bearing member illustrated as an I beam 24. The guides 20 are formed on at least one end with tension adjusting means such as threads to receive tightening nuts 26. (At their other ends the guides 20 similarly may be fitted with nuts or formed with suitable heads.) It is believed evident from consideration of this arrangement that forces which tend to move the guides out of their parallel alignment (such as twisting of the I beam 24) are resisted by the tension forces in the guides 20. To assure such self-realignment, the tension in the guides 20 should be sufficient to provide guide alignment forces greater than the torsion resistance of the compressive load member or means. Also, it is preferable that the plane of reference device be constructed in a symmetrical manner with the guides 20 being symmetrically positioned with respect to the compressive load bearing member or members and with the longitudinal axes of the guides 20 and the compressive load bearing means being in a common plane.

Figure 2:
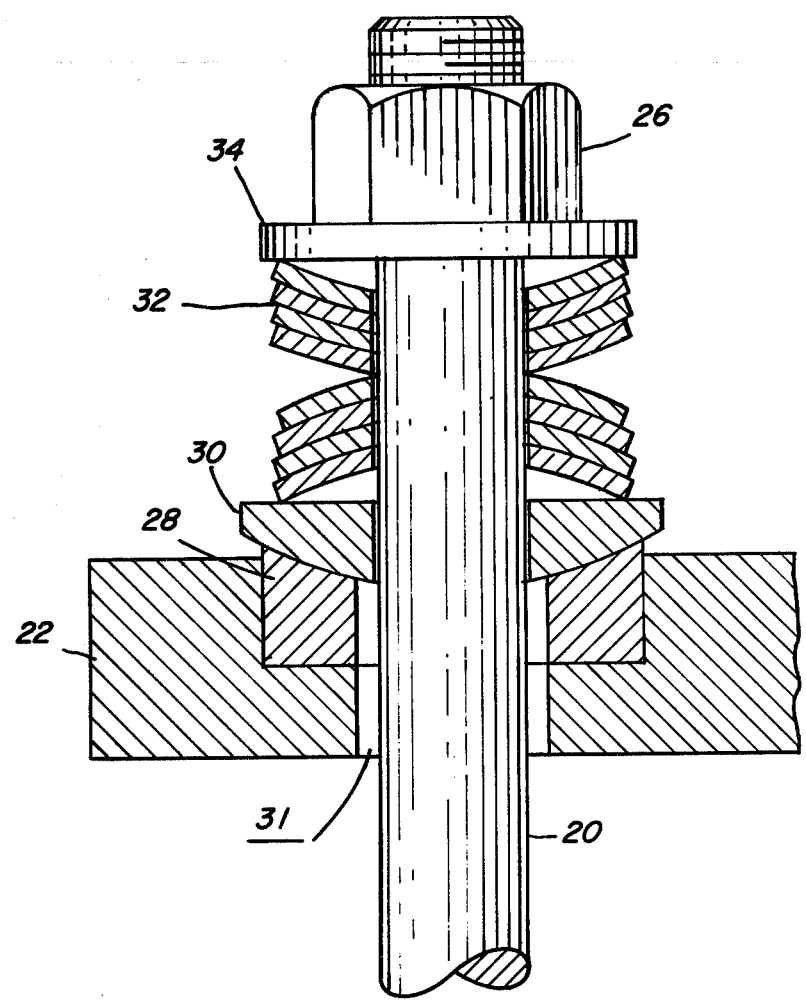
FIG. 2 is an illustration of an embodiment of an attachment of the tensioned rails to the end members.

To enhance the ability of the tensioned guides 20 to maintain their parallel alignment, the guides 20 are preferably supported (at least at one end) against the end support plate 22 through a spherical ball seat. Such a ball seat arrangement as illustrated in FIG. 2 includes an annular ball seat 28 secured in a recess in the end support plate 22 and a washer-like mating ball segment 30, fitted over the guide 20. An adequate clearance 31 is provided to allow guide 20 to assume its aligned position free of contact with the end member 22 or the ball seat 28. Suitable resilient means, shown as a plurality of spring washers 32, are positioned between the ball segment 30 and a flat washer 34 beneath the nut 26 to maintain the guide 20 under a predetermined tension load.

Figure 3:
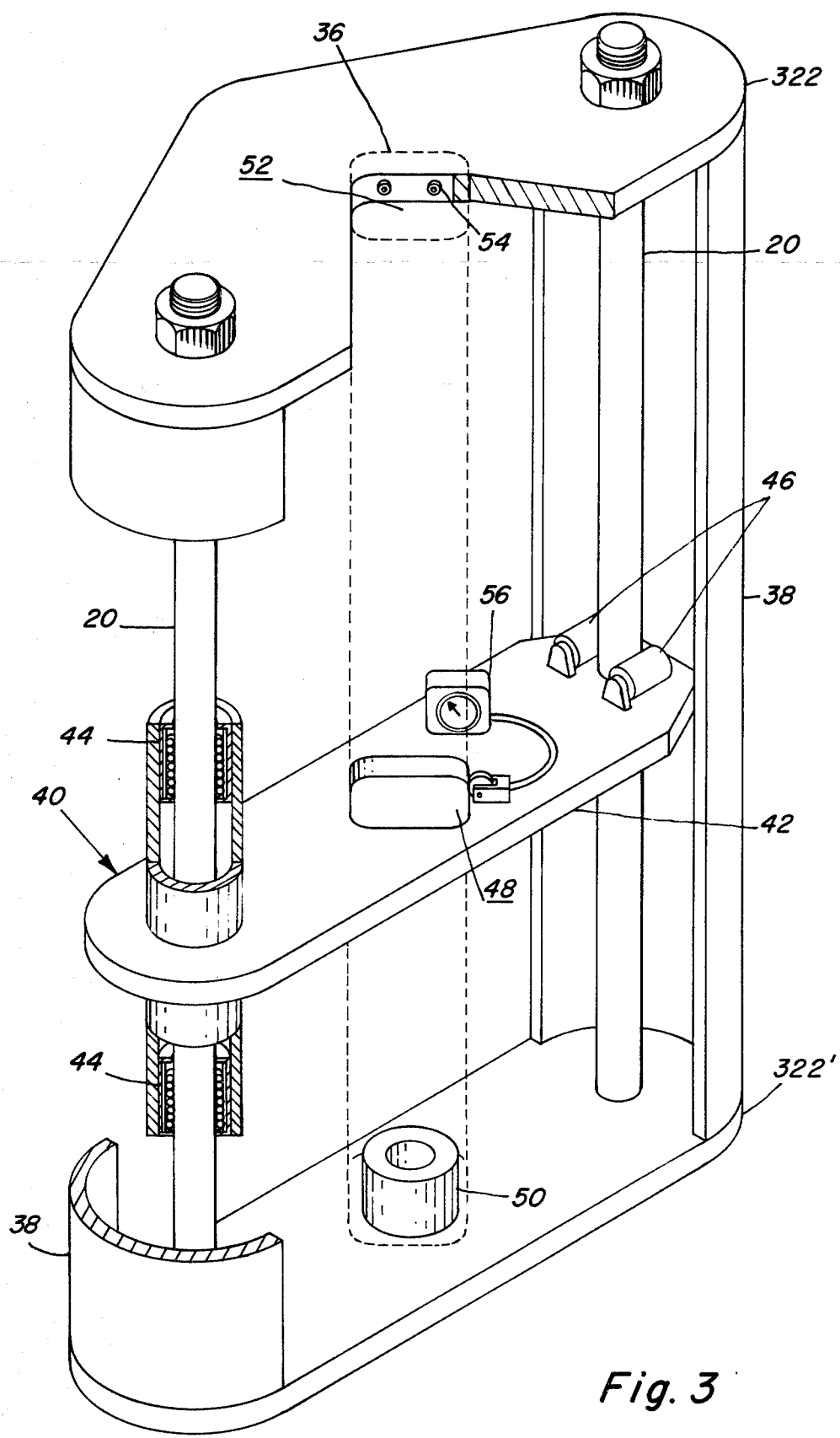
FIG. 3 is a partly cut away isometric view of an embodiment of the invention adapted to measure fuel channels.

Illustrated in FIG. 3 is a version of the invention adapted to measure the dimensions of a fuel channel 36 (shown in phantom view) having the form of an elongated square tube. In this version the guides 20 are tensioned between an upper end plate 322 and a lower end plate 322'. Secured between end plates 322 and 322' is a pair of load bearing members 38 of half tubular form. This half tubular form partly surrounds and protects the guides 20 and reduces the width of the device.

Mounted on the guides 20 for movement therealong is an instrument bearing carriage 40. The carriage 40 includes a base plate 42 mounted at one end to one of the guides 20 by means of a pair of linear ball bushings 44 and guided at its other end along the other guide by a pair of guide rollers 46. Suitable means, such as a motor driven screw, flexible belt, chain, cable or the like (not shown), can be provided to move the carriage 40 along the guides.

Figure 4:
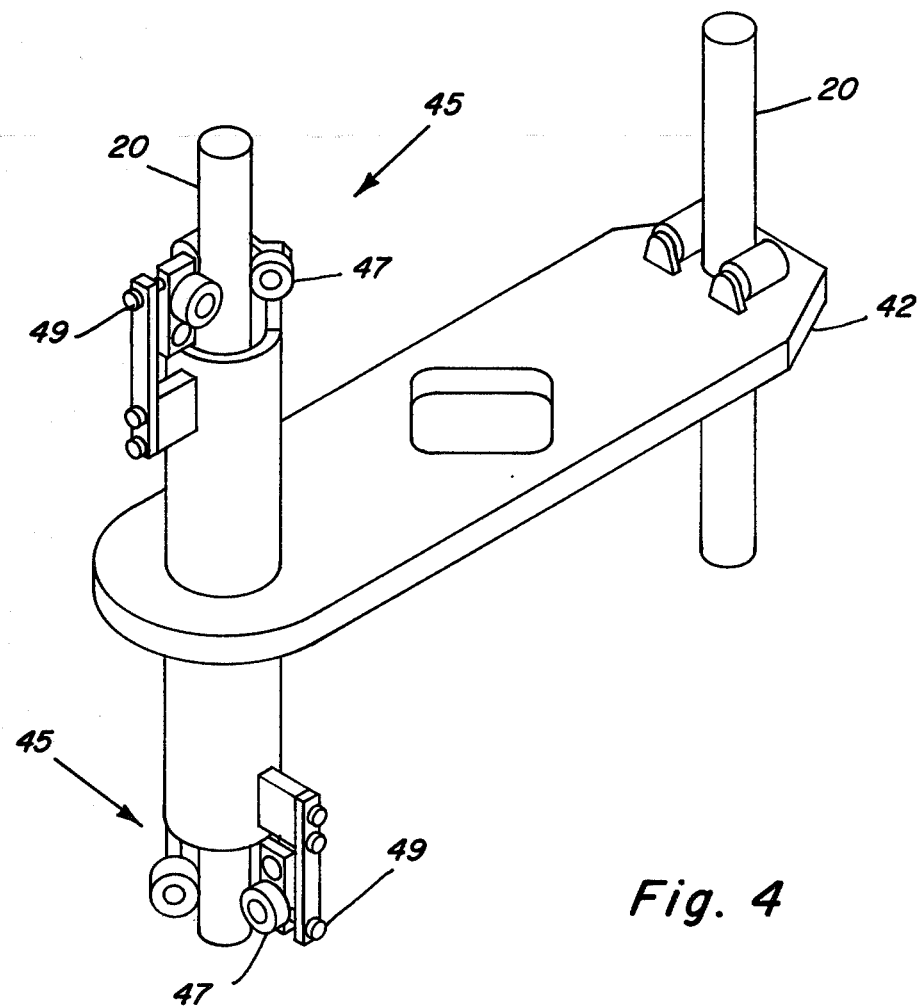
FIG. 4 is a partial isometric view illustration of an alternative manner of mounting a carriage on the tensioned guides.

An alternative and preferred manner of mounting the carriage for movement along the guides 20 is illustrated in FIG. 4. In this arrangement the base plate 42 is mounted at one end to one of the guides 20 by means of a pair of spaced sets of rollers 45 there being at least three rollers 47 spaced around the guide in each such set of rollers. Preferably one of the rollers 47 of each set is adjustably mounted, for example on a pivotable arm as shown in FIG. 4, and means such as a screw 49 are provided for adjustment of the engagement of the rollers 47 with the guide 20.

The base plate 42 of the carriage 40 is formed with a central cutout 48 to pass the channel 36 to be measured. To hold the channel 36 in alignment with the upper and lower end plates, the lower end plate 322' is fitted with a tubular alignment member 50 sized to fit inside the bottom end of the channel and the upper end plate 322 is formed with a cutout portion 52. Adjustable screws 54 can be provided as contact surfaces by which the alignment of the channel 36 with the upper end plate 322 can be adjusted.

The carriage 40 provides a mounting platform for moving any desired measuring instruments along the channel 36 such a profilometer 56 many types of which are known.

In an example of the embodiment of FIG. 3 the guides 20 are centerless ground rods formed of 440 C stainless steel with a diameter of about 3.81 cm and a length of about 4.72 meters. The guides 20 are spaced apart about 52.1 cm and they are tensioned to a stress of about 137.9 MPa. The end plates 322 and 322' are formed of 606 IT6 aluminum alloy with a thickness of about 6.4 cm. The compressive load bearing members 38 are formed of 606 IT6 aluminum alloy with a thickness of about 1.27 cm and a radium of curvature of about 15.24 cm. The weight of the device is in the order of 360 Kg.

What is claimed is:

1. A plane of reference device comprising: a pair of spaced, elongated guides secured in tension between first and second spaced-apart end members; compressive load bearing means positioned between said end members to maintain said end members in spaced apart position, the longitudinal axes of said guides and said compressive load bearing means being in a common plane, said guides being formed with threads on at least one end and fitted with nuts for adjustment of the tension in said guides and including spherical ball seating means between said nuts and the adjacent end member.

2. A plane of reference device comprising: a pair of spaced end members; a compressive load bearing member positioned between said end members to maintain said end members in spaced apart relation; and a pair of spaced, parallel aligned guides secured in tension between said end members, the longitudinal axes of said guides and said compressive load bearing means being in a common plane, the tension in said guides being sufficient to provide realignment forces greater than the torsion resistance of said compressive load bearing means.

3. A plane of reference device comprising: a pair of elongated guides positioned in spaced, parallel alignment between first and second spaced-apart end members; compressive load bearing means positioned between said end members to maintain said end members in spaced apart position; tension adjusting means operative between said guides and at least one of said end members for placing said guides in tension between said end members whereby parallel alignment of said guides is maintained; and spherical ball seating means between said tension adjusting means and the adjacent end member.

4. The device of claim 3 wherein said tension adjusting means comprises threads formed on at least one end of each of said guides fitted with nuts for adjustment of the tension in said guides.

5. The device of claim 3 including resilient means between said tension adjusting means and said spherical ball seating means.

6. The device of claim 5 wherein said resilient means comprises spring washers.

7. A plane of reference device comprising: a pair of spaced, elongated guides secured in tension between first and second spaced-apart end members; and compressive load bearing means positioned between said end members to maintain said end members in spaced apart position, said compressive load bearing means comprising a beam positioned between said guides.

8. The device of claim 7 wherein said guides are symmetrically positioned with respect to said compressive load bearing means.

9. The device of claim 7 wherein the longitudinal axes of said guides and said compressive load bearing means are in a common plane.

10. A plane of reference device comprising: a pair of spaced, elongated guides secured in tension between first and second spaced-apart end members; and compressive load bearing means positioned between said end members to maintain said end members in spaced apart position, said compressive load bearing means comprising a pair of arcuately shaped side members positioned such that said guides are between said side members.

11. The device of claim 10 wherein said guides are symmetrically positioned with respect to said side members.

12. The device of claim 10 wheren the longitudinal axes of said guides and said side members are in a common plane.

13. The device of claim 10 wherein each guide is spaced from the adjacent arcuate side member by a distance about equal to the radius of curvature of said side members.

14. The device of claim 10 including means for receiving and holding in alignment with said end members a component to be measured.

15. The device of claim 10 including a carriage mounted on said guides for movement therealong.

16. The device of claim 15 wherein one end of said carriage is supported for movement along one of said guides by a pair of spaced linear ball bushings and is restrained from rotation by means engaging the other of said guides.

17. The device of claim 15 wherein one end of said carriage is supported for movement along one of said guides by a pair of spaced sets of rollers, including at least three rollers in each set, and is restrained from rotation by means engaging the other of said guides.

18. The device of claim 15 including a component measuring instrument mounted on said carriage.

19. The device of claim 10 wherein said guides are in the form of rods.

20. An arrangement for accurately measuring the dimensions of an elongated self-standing component comprising: a pair of elongated, spaced, parallel aligned guides secured in tension between a pair of spaced end members to form a plane of reference; compressive load bearing means positioned between said end members to maintain said end members in spaced apart relation, the tension in said guides being sufficient to provide realignment forces greater than the torsion resistance of said compressive load bearing means whereby said guides are maintained in parallel alignment; means engaging said elongated component near its opposite ends for positioning said ends of said component in fixed, predetermined positions with respect to said plane of reference whereby the longitudinal axis of said component is generally parallel to said guides; a carriage mounted on said guides for movement therealong adjacent said component; and a measuring instrument mounted on said carriage for indicating the distance between said carriage and said component as said carriage is moved along said guides.

21. The device of claim 20 wherein one end of said carriage is supported for movement along one of said guides by a pair of spaced linear ball bushings and is restrained from rotation by means engaging the other of said guides.

22. The device of claim 20 wherein one end of said carriage is supported for movement along one of said guides by a pair of spaced sets of rollers, including at least three rollers in each set, and is restrained from rotation by means engaging the other of said guides.

23. The device of claim 20 wherein said guides are in the form of rods.

24. The device of claim 20 wherein said guides are formed with threads on at least one end and are fitted with nuts for adjustment of the tension in said guides.

25. The device of claim 24 including spherical ball seating means between said nuts and the adjacent end member.

26. The device of claim 24 including resilient means between said nuts and the adjacent end member.

27. The device of claim 26 wherein said resilient means comprises spring washers.

28. The device of claim 20 wherein said guides are symmetrically positioned with respect to said compressive load bearing means.

29. The device of claim 20 wherein the longitudinal axes of said guides and said compressive load bearing means are in a common plane.

30. The device of claim 20 wherein said compessive load bearing means comprise a pair of arcuately shaped side members positioned such that said guides are between said guide members.

31. The device of claim 30 wherein each guide is spaced from the adjacent arcuate side member by a distance about equal to the radius of curvature of said side members.

* * * * *